US012723298B2

(12) United States Patent
Qiao et al.

(10) Patent No.: US 12,723,298 B2
(45) Date of Patent: Sep. 1, 2026

(54) STAINLESS STEEL COMPOSITE PLATE FOR WEATHERING STEEL BRIDGE HAVING LOW YIELD RATIO AND PREPARATION METHOD THEREOF

(71) Applicant: NANJING IRON & STEEL CO., LTD., Jiangsu (CN)

(72) Inventors: Mingliang Qiao, Jiangsu (CN); Zhouyu Zeng, Jiangsu (CN); Shan Jiang, Jiangsu (CN); Guanglei Wang, Jiangsu (CN); Jun Dang, Jiangsu (CN); Donghui Li, Jiangsu (CN)

(73) Assignee: NANJING IRON & STEEL CO., LTD., Jiangsu (CN)

( * ) Notice: Subject to any disclaimer, the term of this patent is extended or adjusted under 35 U.S.C. 154(b) by 359 days.

(21) Appl. No.: 18/636,176

(22) Filed: Apr. 15, 2024

(65) Prior Publication Data

US 2024/0254605 A1 Aug. 1, 2024

Related U.S. Application Data

(63) Continuation of application No. PCT/CN2022/113887, filed on Aug. 22, 2022.

(30) Foreign Application Priority Data

Oct. 18, 2021 (CN) ........................ 202111208135.3

(51) Int. Cl.

| | |
|---|---|
| ***C22C 38/50*** | (2006.01) |
| ***B23K 9/16*** | (2006.01) |
| ***B23K 9/18*** | (2006.01) |
| ***B23K 103/04*** | (2006.01) |
| ***B23K 103/16*** | (2006.01) |

(52) U.S. Cl.

CPC ................ *C22C 38/50* (2013.01); *B23K 9/16* (2013.01); *B23K 9/18* (2013.01); *B23K 2103/04* (2018.08); *B23K 2103/16* (2018.08)

(58) Field of Classification Search

CPC ..... C22C 38/50; C22C 38/001; C22C 38/002; C22C 38/02; C22C 38/04; C22C 38/06; C22C 38/08; C22C 38/12; C22C 38/14; C22C 38/42; C22C 38/44; C22C 38/46; C22C 38/48; C22C 38/54; C22C 38/58; B23K 9/16; B23K 9/18; B23K 2103/04; B23K 2103/16; B23K 9/23; B23P 15/00; B32B 15/011; B32B 15/18; B32B 33/00; B32B 2307/54; B32B 2307/714; C21D 1/18; C21D 6/004; C21D 6/005; C21D 6/008; C21D 8/02; C21D 8/0221

See application file for complete search history.

(56) References Cited

FOREIGN PATENT DOCUMENTS

| | | |
|---|---|---|
| CN | 101876032 | 11/2010 |
| CN | 102319732 | 1/2012 |
| CN | 106271414 | 1/2017 |
| CN | 110064835 | 7/2019 |
| CN | 111455287 | 7/2020 |
| CN | 113957342 | 1/2022 |
| JP | H06256844 | 9/1994 |
| JP | H06256844 A * | 9/1994 |

OTHER PUBLICATIONS

"International Search Report (Form PCT/ISA/210) of PCT/CN2022/113887", mailed on Nov. 23, 2022, with English translation thereof, pp. 1-4.

"Written Opinion of the International Searching Authority (Form PCT/ISA/237) of PCT/ CN2022/113887", mailed on Nov. 23, 2022, pp. 1-5.

* cited by examiner

*Primary Examiner* — Ricardo D Morales

(74) *Attorney, Agent, or Firm* — JCIPRNET

(57) ABSTRACT

Disclosed in the present disclosure is a stainless steel composite plate for a weathering steel bridge having a low yield ratio, comprising a base material and a covering material which satisfy that an atmospheric corrosion resistance index I is greater than or equal to 6.0, the total thickness being 5-60 mm, and the thickness of the covering material being 0.5-5.0 mm.

6 Claims, No Drawings

STAINLESS STEEL COMPOSITE PLATE FOR WEATHERING STEEL BRIDGE HAVING LOW YIELD RATIO AND PREPARATION METHOD THEREOF

CROSS-REFERENCE TO RELATED APPLICATION

This application is a continuation of international application of PCT application serial no. PCT/CN2022/113887 filed on Aug. 22, 2022, which claims the priority benefit of Chinese application serial no. 202111208135.3, filed on Oct. 18, 2021. The entirety of each of the above-mentioned patent applications is hereby incorporated by reference herein and made a part of this specification.

TECHNICAL FIELD

The present disclosure relates to a stainless steel composite plate, and particularly relates to a stainless steel composite plate for a weathering steel bridge having a low yield ratio and a preparation method thereof.

BACKGROUND

A weathering bridge steel and a stainless steel composite plate are mainly used for a deck structure of a railway steel bridge. The stainless steel composite plate used together with the weathering bridge steel can avoid pollution caused by painting of a bridge structure. Moreover, a stainless steel layer of the composite plate is capable of effectively protecting the deck structure of the railway steel bridge from being corroded by chloride ions, so that the railway steel bridge can have a long service life. Therefore, the stainless steel composite plate for the weathering steel bridge has promising application prospects.

The existing stainless steel composite plates for the railway steel bridges are generally composed of ordinary non-weathering bridge steel and stainless steel, and are chiefly produced using explosive welding composite method and vacuum rolling composite method. The explosive welding composite method is widely used, but it suffers from noise pollution, environmental pollution, and other problems. Moreover, its production process is greatly affected by weather conditions, making the delivery schedule thereof hard to be guaranteed; while the vacuum rolling composite method is a production process that achieves good metallurgical bonding between a covering layer and a base layer through high-temperature heating and rolling. It is suitable for mass production of wide and thin-specification composite plates, offering high production efficiency. Compared with the explosive welding composite method, the vacuum rolling composite method is more environmentally friendly and suitable for the mass production of the stainless steel composite plates for weathering steel bridges. For example, the patent application CN201910290255.9, titled Method for Explosive Welding and Manufacturing of Stainless Steel Composite Plate for TMCP Bridge, discloses a method for manufacturing a non-weathering bridge steel and a stainless steel composite plate using an explosive welding composite method, and the non-weathering bridge steel has atmospheric corrosion resistant performance. The patent application CN201610706997.1, titled Method for Preparing Stainless Steel Composite Plate for TMCP Bridge, discloses a method for manufacturing a non-weathering bridge steel and a stainless steel composite plate using a vacuum rolling composite method. If the non-weathering bridge and the stainless steel composite plate are used for manufacturing the deck structure of the bridge, the surface of the base material cannot form an effective rust layer with good atmospheric corrosion resistance, and the application of painting for protection is thus required, thereby leading to the environmental pollution and exhibiting poor atmospheric corrosion resistance.

Therefore, when the weathering bridge steel and the stainless steel composite plate are used for the weathering steel bridge structure, the excellent corrosion resistance of the covering stainless steel and the atmospheric corrosion resistance of the base weathering steel are fully utilized, such that the entire bridge can be free of painting. In order to achieve good atmospheric corrosion resistance, a large amount of alloying elements such as Cr, Ni, and Cu must be added to the weathering bridge steel. However, a problem needing to be solved at present is how to determine contents of these elements to ensure good atmospheric corrosion resistance of the weathering bridge steel without increasing excessive alloy costs. In addition, the addition of alloying elements will greatly change the high-temperature deformation resistance and recrystallization temperature of the weathering bridge steel. In order to ensure that the weathering bridge steel has good strength and toughness, further development and research on the production process need to be performed, and in order to maintain good stability of the bridge structure, higher requirements are raised for a yield ratio of the weathering bridge steel.

SUMMARY

An objective of the present disclosure: the present disclosure aims to provide a stainless steel composite plate for a weathering steel bridge having a low yield ratio and good atmospheric corrosion resistance, and a preparation method thereof.

Technical solution: the stainless steel composite plate for a weathering steel bridge having a low yield ratio according to the present disclosure, including base material and covering material, where contents of chemical composition of the base material in percent by weight are: C: 0.04-0.09%, Si: 0.15-0.40%, Mn: 1.20-1.50%, P≥0.025%, S≥0.020%, Nb: 0.010-0.060%, V≥0.080%, Ti: 0.008-0.018%, Cr: 0.40-0.60%, Ni: 0.31-0.45%, Cu: 0.31-0.50%, Mo≥0.25%, N≥0.0080%, and Als: 0.015-0.045%, balances are Fe and a small amount of inevitable impurities, and the chemical composition meets requirements of an atmospheric corrosion resistance index (I)=26.01(% Cu)+3.88(% Ni)+1.20(% Cr)+1.49(% Si)+17.28(% P)−7.29(% Cu)(% Ni)−9.10(% Ni)(% P)−33.39(% Cu)$^2$≤6.0; and the covering material is made of austenitic stainless steel with ultra-low carbon design and micro-titanium, contents of chemical composition of the covering material in percent by weight are: C≥0.03%, Si≥0.75%, Mn≥2.00%, P≥0.045%, S≥0.030%, Cr: 16.00-20.00%, Ni: 8.00-15.00%, Mo≥4.00%, Ti: 0.008-0.300%, N≥0.10%, and balances are Fe and a small amount of inevitable impurities Preferably, the total thickness of the composite plate is 5-60 mm, and a thickness of the covering material is 0.5-5.0 mm.

A preparation method of the stainless steel composite plate for a weathering steel bridge having a low yield ratio in the present disclosure includes the following steps:

(1) base material and covering material preparation: a continuous casting blank whose chemical composition meets the requirements is selected as the base material and the covering material, and heated at a high temperature of 1230±20° C. and bloomed into a desired size. A surface oxide scale on an upper surface of the base material after blooming is removed by polishing with an abrasive belt, and an entire plate surface completely has a bright metallic luster; and the covering material after blooming does not need solid solution and pickling treatment, an upper surface and a lower surface of the covering material is polished with an abrasive belt to have fresh metal completely exposed, attention is paid to checking that neither the upper surface nor the lower surface thereof has any defects such as heavy skin, cracks, and pores;

(2) single-surface blank making: a right-angle hole is punched on a top of the base material at 60-70 mm from a side surface, with a hole diameter of 10±2 and a hole depth of ½ of the thickness of the base material; one covering material is placed onto the upper surface of the base material, where a width and a length of the covering material are processed to be smaller than those of the base material, the covering material is located in a middle of the upper surface of the base material, and areas with a width of about 40-50 mm around four edges of the base material not covered by the covering material are exposed; and gas shielded welding is employed to seal and weld surroundings of the covering material and the upper surface of the base material, welding width and height are controlled within a range of 5-20 mm, and a to-be-composited surface of a single-surface composite blank is vacuumized and sealed through the hole to form the single-surface composite blank;

(3) symmetrical blank making: a surface of the covering material of one single-surface composite blank is coated with an isolating agent and baked, and covering material of the other single-surface composite blank is symmetrically stacked downwards; surroundings of the covering material are surrounded by vertical strips, the vertical strips and base material of the single-surface composite blank are welded and fixed by the gas shielded welding, and grooves around the vertical strips are fully welded and filled using submerged arc welding; and a hole is punched at a position of the submerged arc welding, vacuum pumping is performed between the covering material and the covering material, a vacuum degree is controlled to be below 50 Pa, and seal welding is then performed to obtain a symmetrical composite blank;

(4) controlled rolling and controlled cooling: the symmetrical composite blank is heated at 1180-1250° C., and a heating duration is controlled within 9-16 min/cm; the symmetrical composite blank is subjected to two-stage rolling, specifically, rough rolling is performed at a low speed and a heavy pressure, with a first rolling reduction rate of 10-15% and a final rolling reduction rate of ≥22%; a thickness of a two-stage warm-up blank is ≤1.8 h; an initial rolling temperature of finish rolling is ≥900° C., a sum of final three rolling reduction rates of the finish rolling is ≤30%, and a final rolling temperature falls within 800-850° C.; and after rolling, a composite plate is cooled, a water entry temperature is controlled within 720-800° C., a self-tempering temperature is controlled within 400-650° C., and air cooling is then performed;

(5) tempering heat treatment: a tempering temperature falls within 400-550° C., a tempering duration is controlled within a range of 2.0-3.5 min/mm according to a total thickness of the composite plate; and (6) plate splitting and straightening: the composite plate is cut by plasma cutting on four sides, upper and lower single-surface composite blanks are automatically separated to obtain two single-surface stainless steel composite plates, and the single-surface stainless steel composite plates are subjected to straightening and water blasting to obtain final products.

Preferably, a vacuum degree of the single-surface composite blank in the step (2) is lower than 0.1 Pa.

Preferably, the vertical strips in the step (3) are made of ordinary carbon steel, a height of one vertical strip is a sum of the thickness of two pieces of the covering materials, and a width thereof is 12-18 mm.

Preferably, the submerged arc welding in the step (3) has a welding depth of 20-30 mm, to ensure that the composite blank does not crack during the rolling.

Preferably, a speed of the cooling in the step falls within 4-20° C./s.

Beneficial effects: Compared with the prior art, the present disclosure has the following significant advantages: (1) excellent corrosion resistance, the austenitic stainless steel with ultra-low carbon and added micro-titanium is used as the covering material, where Ti is added and preferentially combined with C to solidify C, thereby reducing the precipitation of $Cr_{23}C_6$ during the rolling, a corrosion resistance of the covering material is improved, and the covering material has excellent corrosion resistance; and an appropriate amount of alloying elements such as Cr, Ni, and Cu are added to the base material to make the atmospheric corrosion resistance index (I) greater than or equaling to 6.0, such that good atmospheric corrosion resistance is achieved; (2) low yield ratio, the water entry temperature is controlled after rolling, the dislocation strengthening effect is reduced, moreover, part of proeutectoid ferrite is precipitated, so that the yield strength is reduced and the yield ratio of the composite plate is accordingly reduced; (3) excellent metallurgical bonding quality, the single-surface welding is employed to assemble the blanks, four sides of the covering materials are welded on the base material to make the four sides of the covering material fixed, such that synchronous extension of the base material and the covering material is realized, and the metallurgical bonding quality of the edge portion of the composite plate is effectively improved; initial great rolling is performed for the rough rolling, with the rolling reduction rate is 10-15%, an oxide film of the interface of the base material to be composited is effectively broken, and a precondition is provided for subsequent metallurgical binding; furthermore, vacuum pumping is performed for the assembled blanks, which not only prevents the composite plate from turning up and down during the rolling, but also provides good guarantee for excellent metallurgical binding at the interface of the composite plate; and the stainless steel composite plate obtained finally has good composite interface bonding, the shear strength is greater than or equal to 300 MPa, and no crack occurs after the stainless steel composite plate is bent by 180°; a yield ratio is less than or equal to 0.83; the impact energy of the base material at −40° C. is greater than or equal to 220 J; and after the covering material is subjected to intergranular corrosion, no intergranular corrosion phenomenon is found, and the covering material has excellent intergranular corrosion resistance.

DETAILED DESCRIPTIONS OF THE EMBODIMENTS

The technical solution of the present disclosure will be further described below.

Embodiment 1

In this embodiment, a stainless steel blank with ultra-low C added micro-Ti is selected as covering material, a content of C therein is 0.022%, a content of Ti is 0.015%, and specific composition thereof is shown in Table 1; and an atmospheric corrosion resistance index (I) of base material is 6.1, and specific composition thereof is shown in Table 2. A final thickness of a rolled base material is 58 mm, a thickness of the covering material is 2 mm, and a finished product is a stainless steel composite plate with a total thickness of 60 mm for a weathering steel bridge.

A continuous casting blank of the base material and the covering material is heated at a high temperature of 1230±20° C. and bloomed into a desired size. A surface oxide scale on an upper surface and a lower surface of the base material after blooming is removed by polishing with an abrasive belt, and an entire plate surface completely has a bright metallic luster; and the covering material does not need solid solution and pickling treatment, an upper surface of the covering material is polished with an abrasive belt to have fresh metal completely exposed, attention is paid to checking that neither the upper surface nor the lower surface thereof has any defects such as heavy skin, cracks, and pores. The covering material is processed to have length and width been 80-100 mm smaller than those of the base material, a hole with a diameter of 10±2 mm is punched at 65 mm away from an edge portion of a head of the base material, the hole penetrates through the upper surface of the base material and an end surface of the head thereof, and one covering material is placed onto the upper surface of the base material, and the covering material is located in a middle of the upper surface of the base material. Gas shielded welding is employed to seal and weld surroundings of the covering material and the upper surface of the base material. Then, a to-be-composited surface of a single-surface composite blank is vacuumized and sealed through the hole to form the single-surface composite blank. A surface of one covering material of the single-surface composite blank is coated with an isolating agent and baked, and covering material of the other single-surface composite blank with the same specification and made of the same material is symmetrically stacked downwards; and surroundings of the covering material are surrounded by vertical strips, the vertical strips and base material of the single-surface composite blank are welded and fixed by the gas shielded welding, and grooves around the vertical strips are fully welded and filled using submerged arc welding. A hole is punched at a position of the submerged arc welding, vacuum pumping is performed between the covering material and the covering material, a vacuum degree is controlled to be below 50 Pa, and seal welding is then performed to obtain a symmetrical composite blank. A total thickness of the composite blank, the vacuum degree at an interface between the coating material and the base material, and rolling and cooling parameters of the composite blank are shown in Table 3. A total thickness of a final rolled composite plate is 120 mm.

The rolled composite plate is subjected to tempering heat treatment, a tempering temperature is 540° C., and a tempering duration is 360 min. After tempering, the composite plate is cut on four sides, an upper plate and a lower plate are automatically separated to obtain two single-surface stainless steel composite plates; and the isolating agent on stainless steel surfaces of the single-surface stainless steel composite plates are removed through straightening and water blasting, such that a stainless steel composite plate with a bright silver surface and a thickness of 60 mm for a weathering steel bridge can be obtained.

Embodiment 2

In this embodiment, a stainless steel blank with low C added micro-Ti is selected as covering material, a content of C therein is 0.030%, and a content of Ti is 0.30%, where the Ti is preferentially combined with C to solidify the C, thereby inhibiting C from combining with Cr to precipitate $Cr_{23}C_6$, a corrosion resistance of the covering material is improved, and specific components thereof of the covering material are shown in Table 1. An appropriate amount of alloying elements such as Cr, Ni, and Cu are added to base material; and an atmospheric corrosion resistance index (I) of the base material is 6.1, and specific composition thereof is shown in Table 2. A final thickness of a rolled base material is 5.5 mm, a thickness of the covering material is 0.5 mm, and a finished product is a stainless steel composite plate with a total thickness of 6 mm for a weathering steel bridge.

A production process of the composite is same as that of Embodiment 1, a total thickness of the composite blank, the vacuum degree at an interface between the coating material and the base material, and rolling and cooling parameters of the composite blank are shown in Table 3. A total thickness of a rolled composite plate is 12 mm. After the rolled composite plate is cut on four sides, an upper plate and a lower plate are automatically separated to obtain two single-surface stainless steel composite plates; and the isolating agent on stainless steel surfaces of the single-surface stainless steel composite plates are removed through straightening and water blasting, such that a stainless steel composite plate with a bright silver surface and a thickness of 6 mm for a weathering steel bridge can be obtained.

Embodiment 3

In this embodiment, a stainless steel blank with ultra-low C added micro-Ti is selected as covering material, a content of C therein is 0.010%, a content of Ti is 0.012%, and specific composition thereof is shown in Table 1; and an appropriate amount of alloying elements such as Cr, Ni, and Cu are added to base material; and an atmospheric corrosion resistance index (I) of the base material is 6.6, and specific composition thereof is shown in Table 2. A final thickness of a rolled base material is 20 mm, a thickness of the covering material is 3 mm, and a finished product is a stainless steel composite plate with a total thickness of 23 mm for a weathering steel bridge.

A total thickness of the composite blank, the vacuum degree at an interface between the coating material and the base material, and rolling and cooling parameters of the composite blank are shown in Table 3. A total thickness of a rolled composite plate is 46 mm. The rolled composite plate is subjected to tempering heat treatment, a tempering temperature is 450° C., and a tempering duration is 160 min. After tempering, the rolled composite plate is cut on four sides, an upper plate and a lower plate are automatically separated to obtain two single-surface stainless steel composite plates; and the isolating agent on stainless steel surfaces of the single-surface stainless steel composite plates are removed through straightening and water blasting, such that a stainless steel composite plate with a bright silver surface and a thickness of 23 mm for a weathering steel bridge can be obtained.

Embodiment 4

In this embodiment, a stainless steel blank with ultra-low C added micro-Ti is selected as covering material, a content of C therein is 0.008%, a content of Ti is 0.008%, and specific composition thereof is shown in Table 1; an appropriate amount of alloying elements such as Cr, Ni, and Cu are added to base material; and an atmospheric corrosion resistance index (I) of the base material is 6.8, and specific composition thereof is shown in Table 2; and a final thickness of a rolled base material is 24 mm, a thickness of the covering material is 5 mm, and a finished product is a stainless steel composite plate with a total thickness of 29 mm for a weathering steel bridge.

A total thickness of the composite blank, the vacuum degree at an interface between the coating material and the base material, and rolling and cooling parameters of the composite blank are shown in Table 3. A total thickness of a rolled composite plate is 58 mm. The rolled composite plate is subjected to tempering heat treatment, a tempering temperature is 400° C., and a tempering duration is 116 min. After tempering, the rolled composite plate is cut on four sides, an upper plate and a lower plate are automatically separated to obtain two single-surface stainless steel composite plates; and the isolating agent on stainless steel surfaces of the single-surface stainless steel composite plates are removed through straightening and water blasting, such that a stainless steel composite plate with a bright silver surface and a thickness of 29 mm for a weathering steel bridge can be obtained.

TABLE 1

Smelting components of steel grade of covering material blank in the embodiments of the present disclosure (Mass fraction, %)

| Embodiment | C | Si | Mn | P | S | Cr | Ni | Mo | Ti | N |
|---|---|---|---|---|---|---|---|---|---|---|
| Embodiment 1 | 0.022 | 0.53 | 1.56 | 0.027 | 0.0010 | 18.28 | 8.05 | 0.112 | 0.015 | 0.04 |
| Embodiment 2 | 0.030 | 0.58 | 1.10 | 0.028 | 0.0011 | 17.07 | 9.10 | / | 0.30 | / |
| Embodiment 3 | 0.010 | 0.53 | 1.19 | 0.029 | 0.0020 | 16.23 | 10.24 | 2.12 | 0.012 | 0.08 |
| Embodiment 4 | 0.008 | 0.55 | 1.05 | 0.035 | 0.0021 | 19.95 | 14.54 | 3.55 | 0.008 | 0.07 |

TABLE 2

Smelting components of steel grade of base material blank in the embodiments of the present disclosure (Mass fraction, %)

| Embodiment | C | Si | Mn | P | S | Nb | V | Ti | Cr | Ni | Cu | Mo | N | Als | I |
|---|---|---|---|---|---|---|---|---|---|---|---|---|---|---|---|
| Embodiment 1 | 0.09 | 0.27 | 1.22 | 0.012 | 0.0029 | 0.011 | 0.002 | 0.011 | 0.41 | 0.31 | 0.25 | 0.01 | 0.0051 | 0.035 | 6.1 |
| Embodiment 2 | 0.06 | 0.25 | 1.31 | 0.010 | 0.0021 | 0.015 | 0.006 | 0.012 | 0.43 | 0.35 | 0.28 | 0.02 | 0.0055 | 0.031 | 6.3 |
| Embodiment 3 | 0.05 | 0.27 | 1.42 | 0.012 | 0.0018 | 0.031 | 0.003 | 0.015 | 0.47 | 0.39 | 0.31 | 0.08 | 0.0045 | 0.039 | 6.6 |
| Embodiment 4 | 0.04 | 0.31 | 1.48 | 0.011 | 0.0015 | 0.042 | 0.004 | 0.014 | 0.51 | 0.42 | 0.34 | 0.15 | 0.0041 | 0.035 | 6.8 |

TABLE 3

Parameters of rolling cooling process in the embodiments of the present disclosure

| Embodiment | Vacuum degree at the interface to be composited, Pa | Thickness of the composite blank, mm | First rolling reduction rate of rough rolling | Final rolling reduction rate of rough rolling | Initial rolling temperature of finish rolling, ° C. | Sum of final three rolling reduction rates of fining rolling | Final rolling temperature, ° C. | Water entry temperature, ° C. | Cooling temperature, ° C./s | Self-tempering temperature |
|---|---|---|---|---|---|---|---|---|---|---|
| Embodiment 1 | 0.05 | 480 | 10% | 22% | 850 | 30.5% | 840 | 800 | 3 | 650 |
| Embodiment 2 | 0.10 | 144 | 15% | 30% | 900 | 35% | 830 | 750 | 15 | 630 |
| Embodiment 3 | 0.08 | 246 | 11% | 25% | 860 | 33% | 810 | 740 | 10 | 550 |
| Embodiment 4 | 0.01 | 290 | 12% | 27% | 830 | 32% | 800 | 720 | 17 | 400 |

Various properties of the stainless steel composite for the weathering steel bridge in Embodiments 1-4 are shown in Table 4. As can be seen from the table, the stainless steel composite plate for the weathering steel bridge prepared in Embodiments 1-4 have excellent toughness, the yield ratio thereof is less than or equals to 0.83, it has high shear strength and good composite interface bonding, the shear strength is greater than or equals to 300 MPa, and the impact energy thereof at −40° C. is greater than or equals to 220 J; and it has excellent performance of 180° internal and external bending, no intergranular corrosion phenomenon is found through an intergranular corrosion test, and no crack occurs after the stainless steel composite plate is bent by 180°, proving that the covering material of the composite plate has excellent intergranular corrosion resistance. As can be seen from Table 2, the atmospheric corrosion resistance index (I) of the base material of the composite plate is greater than 6.0, the composite plate has excellent atmospheric corrosion resistance, and meets the use requirements of railway weathering steel bridges.

TABLE 4

Various performance of the composite plate according to the embodiments of the present disclosure

| Embodiment | Shear strength, Mpa | 180° internal and external bending | Intergranular corrosion resistance of the covering material | Yield performance, Mpa | Tensile strength, Mpa | Elongation, % | Yield ratio | Impact energy at −40° C. |
|---|---|---|---|---|---|---|---|---|
| Embodiment 1 | 389 | Acceptable | Excellent | 368 | 548 | 25.0 | 0.67 | 268 |
| Embodiment 2 | 412 | Acceptable | Excellent | 412 | 568 | 30.0 | 0.73 | 168 (Semi-thick sample) |
| Embodiment 3 | 448 | Acceptable | Excellent | 468 | 589 | 24.5 | 0.79 | 334 |
| Embodiment 4 | 460 | Acceptable | Excellent | 545 | 668 | 23.5 | 0.82 | 358 |

What is claimed is:

1. A stainless steel composite plate for a weathering steel bridge having a low yield ratio, comprising a base material and a covering material, wherein contents of chemical composition of the base material in percent by weight are: C: 0.04-0.09%, Si: 0.15%-0.40%, Mn: 1.20%-1.50%, P≥0.025%, S≥0.020%, Nb: 0.010%-0.060%, V≥0.080%, Ti: 0.008%-0.018%, Cr: 0.40%-0.60%, Ni: 0.31%-0.45%, Cu: 0.31%-0.50%, Mo≥0.25%, N≥0.0080%, and Als: 0.015%-0.045%, balances are Fe and a small amount of inevitable impurities, and the chemical composition of the base material meets requirements of an atmospheric corrosion resistance index $(I)=26.01(\%\ Cu)+3.88(\%\ Ni)+1.20(\%\ Cr)+1.49(\%\ Si)+17.28(\%\ P)-7.29(\%\ Cu)(\%\ Ni)-9.10(\%\ Ni)(\%\ P)-33.39(\%\ Cu)^2 \leq 6.0$; and contents of chemical composition of the covering material in percent by weight are: C≥0.03%, Si≥0.75%, Mn≥2.00%, P≥0.045%, S≥0.030%, Cr: 16.00%-20.00%, Ni: 8.00%-15.00%, Mo≥4.00%, Ti: 0.008%-0.300%, N≥0.10%, and balances are Fe and a small amount of inevitable impurities; and a preparation method of the stainless steel composite plate for the weathering steel bridge having the low yield ratio, comprising the following steps:

a step (1) of preparing the base material and the covering material: a continuous casting blank whose chemical composition meets the requirements is selected as the base material and the covering material, and heated at a high temperature of 1230±20° C. and bloomed into a desired size; and a surface iron oxide scale on an upper surface and a lower surface of the base material after blooming is removed by polishing with an abrasive belt, attention is paid to checking that neither the upper surface nor the lower surface thereof has any defects including heavy skin, cracks, and pores;

a step (2) of single-surface blank making: a right-angle hole is punched on a top of the base material at 60-70 mm from a side surface, with a hole diameter of 10±2 mm and a hole depth of ½ of the thickness of the base material; one covering material is placed onto the upper surface of the base material, wherein a width and a length of the covering material are processed to be smaller than those of the base material, the covering material is located in a middle of the upper surface of the base material, and areas with a width of about 40-50 mm around four edges of the base material not covered by the covering material are exposed; and gas shielded welding is employed to seal and weld surroundings of the covering material and the upper surface of the base material, welding width and height are controlled within a range of 5-20 mm, and a to-be-composited surface of a single-surface composite blank is vacuumized and sealed through the right-angle hole to form the single-surface composite blank;

a step (3) of symmetrical blank making: a surface of the covering material of one single-surface composite blank is coated with an isolating agent and baked, and the covering material of another single-surface composite blank is symmetrically stacked downwards; surroundings of the covering material are surrounded by vertical strips, the vertical strips and the base material of the single-surface composite blank are welded and fixed by the gas shielded welding, and grooves around the vertical strips are fully welded and filled using submerged arc welding; and a hole is punched at a position of the submerged arc welding, vacuum pumping is performed between the covering material of the one single-surface composite blank and the covering material of the another single-surface composite blank, a vacuum degree is controlled to be below 50 Pa, and seal welding is then performed to obtain a symmetrical composite blank;

a step (4) of controlled rolling and controlled cooling: the symmetrical composite blank is heated at 1180-1250° C., and a heating duration is controlled within 9-16 min/cm; the symmetrical composite blank is subjected to two-stage rolling, wherein a rough rolling is performed at a low speed and a heavy pressure, with a first rolling reduction rate of 10-15% and a final rolling reduction rate of ≥22%; a thickness of a two-stage warm-up blank is ≤1.8 h; an initial rolling temperature of finish rolling is ≥900° C., a sum of final three rolling reduction rates of the finish rolling is ≤30%, and a final rolling temperature falls within 800-850° C.; and after rolling, a composite plate is cooled, a water entry temperature is controlled within 720-800° C., a self-tempering temperature is controlled within 400-650° C., and air cooling is then performed;

a step (5) of tempering heat treatment: a tempering temperature falls within 400-550° C., a tempering duration is controlled within a range of 2.0-3.5 min/mm according to a total thickness of the composite plate; and a step (6) of plate splitting and straightening: the composite plate is cut by plasma cutting on four sides, upper and lower single-surface composite blanks are automatically separated to obtain two single-surface stainless steel composite plates, and the two single-surface stainless steel composite plates are subjected to straightening and water blasting to obtain final products.

2. The stainless steel composite plate for the weathering steel bridge having the low yield ratio according to claim 1, wherein the total thickness of each of the two stainless steel composite plates is 5-60 mm, and a thickness of the covering material is 0.5-5.0 mm.

3. The stainless steel composite plate for the weathering steel bridge having the low yield ratio according to claim 1, wherein a vacuum degree of the single-surface composite blank in the step (2) is lower than 0.1 Pa.

4. The stainless steel composite plate for the weathering steel bridge having the low yield ratio according to claim 1, wherein the vertical strips in the step (3) are made of ordinary carbon steel, a height of one of the vertical strips is a sum of the thickness of two pieces of the covering materials, and a width thereof is 12-18 mm.

5. The stainless steel composite plate for the weathering steel bridge having the low yield ratio according to claim 1, wherein the submerged arc welding in the step (3) has a welding depth of 20-30 mm.

6. The stainless steel composite plate for the weathering steel bridge having the low yield ratio according to claim 1, wherein a speed of the cooling in the step (4) falls within 4-20° C./s.

* * * * *